(12) United States Patent
Takagi et al.

(10) Patent No.: US 10,508,214 B2
(45) Date of Patent: Dec. 17, 2019

(54) COATING COMPOSITION AND COATED METAL PLATE, METAL CONTAINER AND METAL CLOSURE COATED WITH THE COATING COMPOSITION

(71) Applicants: Toyo Seikan Group Holdings, Ltd., Tokyo (JP); VALSPAR ROCK CO., LTD., Koto-ku, Tokyo (JP)

(72) Inventors: Naoyuki Takagi, Yokohama (JP); Keizou Kanzaki, Yokohama (JP); Nobuaki Sano, Tokyo (JP); Mayumi Arai, Tokyo (JP)

(73) Assignees: TOKYO SEIKAN GROUP HOLDINGS, LTD., Tokyo (JP); VALSPAR ROCK CO., LTD., Tokyo (JP)

( * ) Notice: Subject to any disclaimer, the term of this patent is extended or adjusted under 35 U.S.C. 154(b) by 421 days.

(21) Appl. No.: 14/404,192

(22) PCT Filed: May 27, 2013

(86) PCT No.: PCT/JP2013/064659
§ 371 (c)(1),
(2) Date: Nov. 26, 2014

(87) PCT Pub. No.: WO2013/180067
PCT Pub. Date: Dec. 5, 2013

(65) Prior Publication Data
US 2015/0125643 A1    May 7, 2015

(30) Foreign Application Priority Data
May 31, 2012    (JP) ................................ 2012-124819

(51) Int. Cl.
| | | |
|---|---|---|
| C09D 167/02 | (2006.01) | |
| B65D 25/14 | (2006.01) | |
| C08L 61/06 | (2006.01) | |
| C08L 61/28 | (2006.01) | |

(52) U.S. Cl.
CPC ........... C09D 167/02 (2013.01); B65D 25/14 (2013.01); C08L 61/06 (2013.01); C08L 61/28 (2013.01); Y10T 428/1355 (2015.01); Y10T 428/31681 (2015.04)

(58) Field of Classification Search
CPC .......... B65D 25/14; B65D 1/12; B65D 25/34; C09D 167/02; C09D 167/03; C08L 67/02; C08L 67/04; Y10T 428/1355; Y10T 428/31681
USPC ................. 428/35.8; 524/539; 525/438, 444; 427/385.5, 388.1
See application file for complete search history.

(56) References Cited

U.S. PATENT DOCUMENTS

| | | | |
|---|---|---|---|
| 6,184,311 B1 * | 2/2001 | O'Keeffe | C09D 163/00 427/385.5 |
| 7,030,197 B2 | 4/2006 | Morimoto et al. | |
| 7,452,938 B2 | 11/2008 | Morimoto et al. | |
| 2002/0114953 A1 * | 8/2002 | Itou | C09D 167/00 428/413 |
| 2006/0093768 A1 * | 5/2006 | Parekh | C08G 18/4202 428/35.8 |
| 2008/0220178 A1 * | 9/2008 | Moens | C08L 67/02 427/458 |
| 2009/0047524 A1 * | 2/2009 | Yaoi | B32B 7/12 428/418 |
| 2010/0310801 A1 * | 12/2010 | Moens | C09D 167/02 428/35.8 |
| 2012/0064447 A1 * | 3/2012 | Hozumi | G03G 9/0819 430/105 |
| 2012/0107629 A1 | 5/2012 | Moens | |
| 2016/0264816 A1 * | 9/2016 | O'Dell | C09D 167/00 |

FOREIGN PATENT DOCUMENTS

| | | |
|---|---|---|
| EP | 2128209 A1 | 12/2009 |
| JP | 10-130571 A | 5/1998 |
| JP | 2001-131470 A | 5/2001 |
| JP | 2002-201411 A | 7/2002 |
| JP | 2003-089746 A | 3/2003 |
| JP | 2003-213201 A | 7/2003 |
| JP | 2003-301137 A | 10/2003 |
| JP | 2004-346131 A | 12/2004 |
| JP | 2005-126635 A | 5/2005 |
| JP | 2006-037014 A | 2/2006 |

(Continued)

OTHER PUBLICATIONS

Communication dated Jan. 13, 2016, from the European Patent Office in counterpart European Application No. 13796325.2.

(Continued)

*Primary Examiner* — Lee E Sanderson
(74) *Attorney, Agent, or Firm* — Sughrue Mion, PLLC

(57) ABSTRACT

The present invention relates to a polyester coating composition used for forming a coating film of a coated metal plate, a metal container, a metal closure, etc. The coating composition has a crosslinking agent and a curing catalyst incorporated into a mixed polyester resin comprising a mixture of a polyester resin (A) having an acid value of 2 to 50 mg KOH/g and a glass transition temperature (Tg) of 35 to 100° C. and a polyester resin (B) having an acid value of 0 to 50 mg KOH/g and a glass transition temperature (Tg) of −20 to 25° C. Thus, a coating composition excellent in resistance to embrittlement over time, corrosion resistance, scrape resistance, retort resistance, and blocking resistance can be provided.

5 Claims, No Drawings

(56) References Cited

FOREIGN PATENT DOCUMENTS

| JP | 2006-077118 A | 3/2006 |
|----|---------------|--------|
| JP | 2011-016360 A | 1/2011 |
| WO | 02/055620 A2 | 7/2002 |
| WO | 2011/003761 A1 | 1/2011 |

OTHER PUBLICATIONS

International Search Report for PCT/JP2013/064659 dated Aug. 27, 2013 [PCT/ISA/210].

* cited by examiner

COATING COMPOSITION AND COATED METAL PLATE, METAL CONTAINER AND METAL CLOSURE COATED WITH THE COATING COMPOSITION

CROSS REFERENCE TO RELATED APPLICATIONS

This application is a National Stage of International Application No. PCT/JP2013/064659 filed May 27, 2013, claiming priority based on Japanese Patent Application No. 2012-124819 filed May 31, 2012, the contents of all of which are incorporated herein by reference in their entirety.

TECHNICAL FIELD

This invention relates to a polyester-based coating composition. More particularly, the invention relates to a polyester-based coating composition excellent in resistance to embrittlement over time, processability, corrosion resistance, scrape resistance, retort resistance, and blocking resistance, and a coated metal plate, a metal closure, and a metal container, each coated with the coating composition.

BACKGROUND ART

Organic coating films for protecting metal containers or metal closures prevent corrosion of the metal substrate due to the contents, etc. Moreover, metal containers undergo machining such as neck-in processing, bead processing, or seaming of closures. Metal closures with an easy open end (may be referred to hereinafter as "EOE") are also subjected to harsh processing such as scoring or riveting. Thus, excellent corrosion resistance and processability are required of coating compositions used for metal containers or metal closures.

To satisfy the above-mentioned requirements, various polyester-based coating compositions have been proposed.

Patent Document 1 to be indicated later, for example, proposes a coating composition comprising a hydroxyl group-containing polyester resin, a specific phenolic resin crosslinking agent, and an acid catalyst mixed in predetermined amounts. This coating composition is described as being capable of forming a coating film which has a good balance between processability and hardness, and is excellent in adhesion, curability, hygiene and boiling water resistance. Patent Documents 2 and 3 shown below describe coating resin compositions prepared using polyester resins containing molecules having pendant carboxyl groups introduced into the molecular chains. The aqueous resin composition of Patent Document 2 is described as excellent in curability, processability, retort resistance, hygiene, spray coatability and water dispersibility, while the coating resin composition of Patent Document 3 is described as being particularly superior in adhesion to metal surfaces and fulfilling high processability and high corrosion resistance.

Furthermore, polyester-based coating compositions involve the characteristic problem that the processability of the film after coating declines over time during storage.

Patent Document 4 indicated below proposes a polyester resin composition containing a polyester resin having a low Tg and a crosslinking agent, the polyester resin consisting essentially of 2-methyl-1,3-propanediol, 1,4-butanediol and 1,4-cyclohexanedimethanol as a polyalcohol component. This polyester resin composition is described as having processability, retort resistance, flavor properties, resistance to contents, feathering resistance, and sulfur resistance. The polyester resin composition is also described as having high processability and feathering resistance required for an inner surface coating for EOE, and as being capable of suppressing deterioration in processability over time. Patent Document 5 proposes a coating composition with a moderately branched polymeric polyester resin and containing a vertically asymmetric dihydric alcohol component. This coating composition is described as showing no decline over time in the processability of the film coated, and as being excellent in adhesion to materials and having a good balance between hardness and processability.

Patent Document 4 describes that the preferred polyester resin has a glass transition temperature (Tg) of 20-50° C., whereas Patent Document 5 mentions no glass transition temperature.

PRIOR ART DOCUMENTS

Patent Documents

Patent Document 1: JP-A-2001-131470
Patent Document 2: JP-A-2003-89746
Patent Document 3: JP-A-2003-213201
Patent Document 4: JP-A-2004-346131
Patent Document 5: JP-A-2002-201411

SUMMARY OF THE INVENTION

Problems to be Solved by the Invention

Lowering of the glass transition temperature (Tg) as in the coating composition of Patent Document 4 curtailed deterioration over time in the processability (embrittlement over time) of the film after coating, and improved its processability. However, a mere drop in the glass transition temperature was not successful in fully satisfying all the coating film performance characteristics required of metal containers or closures, such as corrosion resistance, scrape resistance, blocking resistance, and retort resistance. Thus, such a coating composition only with a lowered Tg was not sufficiently satisfactory as a coating composition applicable to metal containers or metal closures (Comparative Examples 13 and 14).

An object of the present invention is to provide a coating composition which gives a coating film further improved in resistance to embrittlement over time and excellent in all of coating film performance characteristics such as processability, corrosion resistance, scrape resistance, blocking resistance, and retort resistance.

Another object of the present invention is to provide a coated metal plate having excellent coating film performance characteristics and preferably usable for the formation of metal containers or metal closures.

Still another object of the present invention is to provide a metal container or a metal closure excellent in corrosion resistance and retort resistance.

Means for Solving the Problems

According to the present invention, there is provided a coating composition containing a crosslinking agent and a curing catalyst in combination with a mixed polyester resin comprising a mixture of a polyester resin (A) having an acid value of 2 to 50 mg KOH/g and a glass transition temperature (Tg) of 35 to 100° C. and a polyester resin (B) having an acid value of 0 to 50 mg KOH/g and a glass transition temperature (Tg) of −20 to 25° C.

In the coating composition of the present invention, the following features are preferred:
1. The polyester resin (A) is a polyester resin provided with the acid value of the resin upon the ring-opening addition reaction of a compound having one or more carboxylic acid anhydride structures in the molecule;
2. The weight ratio between the polyester resin (A) and the polyester resin (B) is (A):(B)=99:1 to 50:50;
3. The glass transition temperature (Tgmix) of the mixed polyester resin calculated from the following Equation (1) is 35° C. or higher $$1/T\text{gmix}=Wa/Tga+Wb/Tgb \quad (1)$$

where Tgmix represents the glass transition temperature (K) of the mixed polyester resin, Tga represents the glass transition temperature (K) of the polyester resin (A), Tgb represents the glass transition temperature (K) of the polyester resin (B), Wa represents the weight fraction of the polyester resin (A), and Wb represents the weight fraction of the polyester resin (B);
4. The crosslinking agent comprises a resol type phenolic resin and/or an amino resin, and is incorporated in an amount of 1 to 30 parts by weight based on 100 parts by weight of the resin solids content of the polyester resins (A) and (B); and
5. The curing catalyst is incorporated in an amount of 0.1 to 3.0 parts by weight based on 100 parts by weight of the total resin solids content.

According to the present invention, a coated metal plate coated with the above-described coating composition is also provided.

The coated metal plate of the present invention preferably has the coating composition coil baked.

According to the present invention, moreover, a metal container or a metal closure provided with a coating film comprising the coating composition is provided.

Effects of the Invention

The cause of embrittlement over time, one of the problems to be solved by the coating composition of the present invention, has not been elucidated accurately, but is presumed by the present inventors to be as follows:

Enthalpy relaxation begins in the coating film immediately after curing, and proceeds over time to cause molecular reorientation (shift to a state of equilibrium). As a result, the coating film may embrittle, and its processability may deteriorate. To suppress this phenomenon of embrittlement over time, two methods are conceivable: One of the methods is to increase the crosslinking density of the cured coating film to reduce molecular movement, thereby curtailing enthalpy relaxation. The other method is to maintain molecular movement (retention of nonequilibrium state) even at a temperature during storage over time, thereby causing no enthalpy relaxation.

With the former method, however, the cured coating film cannot attain adequate processability from the initial stage onward. With the latter method, the embrittlement over time of the cured coating film can be suppressed, but corrosion resistance to the contents, scrape resistance during forming, blocking resistance of the coated metal plate, and retort resistance at the time of sterilization are insufficient. Thus, both methods have been found to be unsuccessful in obtaining sufficient coating film performance for practical use.

Against the above background, a polyester resin (A) for increasing the crosslinking density, which can suppress the molecular motion to inhibit enthalpy relaxation as the cause of embrittlement over time, and a polyester resin (B) with a low Tg capable of retaining the molecular motion even at the temperature during storage over time of the cured coating film are used in combination in the coating composition of the present invention. This has led to an invention of a coating composition which can form a coating film excellent in all of the coating film performance characteristics, such as resistance to embrittlement over time, processability, corrosion resistance, scrape resistance, blocking resistance, and retort resistance.

The coated metal plate obtained by coating the coating composition of the present invention has the above-mentioned excellent coating film performance characteristics, and can be used suitably for metal containers or metal closures.

Furthermore, the metal container and metal closure of the present invention has superior corrosion resistance and retort resistance.

The above-described effects of the present invention are clear from the results of Examples to be described later.

That is, the coated metal plate and metal closure prepared using the coating composition of the present invention were excellent in both of initial processability after formation and processability after passage of time, and excellent in all of corrosion resistance, retort resistance, blocking resistance and scrape resistance (Examples 1 to 20). Failure to satisfy any one of the requirements of the present invention, on the other hand, was found to be unsuccessful in satisfying all of these coating film performance characteristics (Comparative Examples 1 to 14).

In the Examples and the Comparative Examples, evaluations were made only in the metal closures for the following reasons: The metal closure is formed by processing the coated metal plate. On the other hand, the coated metal container is formed by molding the container, and then coating the container. As noted here, the degree of processing is higher for the coating film on the coated metal closure. If satisfactory evaluation results are obtained on the metal closure, therefore, it goes without saying that satisfactory evaluation results are obtained on the metal container as well. Thus, evaluations were conducted only in the metal closures.

MODE FOR CARRYING OUT THE INVENTION

The coating composition of the present invention will be described in further detail below.

[Polyester Resin (A)]

The polyester resin (A) used for the coating composition of the present invention is not limited and any polyester resin comprising various carboxylic acid components and alcohol components can be used, as long as its acid value is in the range of 2 to 50 mg KOH/g, especially 5 to 30 mg KOH/g, and its glass transition temperature (Tg) is in the range of 35 to 100° C., especially 50 to 90° C.

It is important that the acid value of the polyester resin (A) of the present invention be within the above range, whereby adhesion to a metal substrate is increased, and processability is enhanced. The increase in adhesion to the substrate, in particular, makes it difficult for corrosion inducing substances (salts and acids) to reach the metal, thus leading to excellent corrosion resistance. The crosslinking density also increases, contributing to suppressing the embrittlement of the cured coating film over time ascribed to enthalpy relaxation. If the acid value is below the aforementioned range, sufficient adhesion to the substrate is not achieved, and it may become difficult to fulfill both of processability and corrosion resistance. Moreover, the crosslinking density minimally increases, and the effect of suppressing the embrittlement over time of the cured coating film may be insufficient. If the acid value is above the aforementioned range, water resistance of the coating film may lower.

If the glass transition temperature (Tg) of the polyester resin (A) is lower than the aforementioned range, blocking resistance may be inferior. If the Tg is higher than the above range, on the other hand, the solubility of the coating composition in a solvent may be poor.

As the carboxylic acid component used in the polyester resin (A), there can be named aromatic dicarboxylic acids such as terephthalic acid, isophthalic acid, orthophthalic acid and naphthalenedicarboxylic acid; aliphatic dicarboxylic acids such as succinic acid, glutaric acid, adipic acid, azelaic acid, sebacic acid, dodecanedioic acid and dimer acid; unsaturated dicarboxylic acids such as maleic acid (anhydride), fumaric acid, dodecenyl succinic anhydride and terpene-maleic acid adduct; alicyclic dicarboxylic acids such as 1,4-cyclohexanedicarboxylic acid, tetrahydrophthalic acid, hexahydroisophthalic acid, and 1,2-cyclohexenedicarboxylic acid; trivalent or higher valent carboxylic acids such as trimellitic acid (anhydride), pyromellitic acid (anhydride) and methylcyclohexenetricarboxylic acid; and monocarboxylic acids such as 4,4-bis(4'-hydroxyphenyl)-pentanoic acid, 4-mono(4'-hydroxyphenyl)-pentanoic acid, and p-hydroxybenzoic acid. One or more of these carboxylic acids can be selected arbitrarily and used.

Examples of the alcohol component used in the polyester resin (A) are aliphatic glycols such as ethylene glycol, propylene glycol (1,2-propanediol), 1,3-propanediol, 1,4-butanediol, 1,2-butanediol, 1,3-butanediol, 2-methyl-1,3-propanediol, neopentyl glycol, 1,5-pentanediol, 1,6-hexanediol, 3-methyl-1,5-pentanediol, 2-ethyl-2-butyl-1,3-propanediol, 2,4-diethyl-1,5-pentanediol, 1-methyl-1,8-octanediol, 3-methyl-1,6-hexanediol, 4-methyl-1,7-heptanediol, 4-methyl-1,8-octanediol, 4-propyl-1,8-octanediol, and 1,9-nonanediol; ether glycols such as diethylene glycol, triethylene glycol, polyethylene glycol, polypropylene glycol, and polytetramethylene glycol; alicyclic polyalcohols such as 1,4-cyclohexanedimethanol, 1,3-cyclohexanedimethanol, 1,2-cyclohexanedimethanol, tricyclodecane glycols, and hydrogenated bisphenols; and trivalent or higher valent polyalcohols such as trimethylolpropane, trimethylolethane, and pentaerythritol. One or more of these alcohols can be selected arbitrarily and used.

In the polyester resin (A) used in the present invention, the crosslinking density of the coating film should be increased to suppress the molecular motion, thereby impeding enthalpy relaxation which is the cause of the phenomenon of embrittlement over time. From this point of view, it is particularly preferred that a molecule having a carboxyl group introduced in a pendant state in the molecular chain be contained in the polyester (A).

An example of a method for obtaining such a polyester is, but not limited to, the ring-opening addition reaction of a compound having one or more carboxylic anhydride groups in the molecule, the reaction described in JP-A-2003-213201.

In the polyester resin (A) provided with the resin acid value as a result of the ring-opening addition reaction of the compound having one or more carboxylic anhydride structures in the molecule, when the total content of carboxylic anhydrides used for the ring-opening addition reaction is 100 mol %, it is preferred that 10 mol % or more of the carboxylic anhydrides to be used be a compound having two or more carboxylic anhydride groups in the molecule.

The compound having the two or more carboxylic anhydride groups in the molecule is capable of introducing the carboxyl groups into the resin molecular chain, as well as into the polyester resin terminal, for modification. By introducing the carboxyl groups into the resin molecular chain for modification, it becomes possible to impart an acid value regardless of the molecular weight. Furthermore, probably because of a low molecular weight between the carboxyl groups, adhesion to the substrate is further increased, so that a coating film with even higher corrosion resistance can be obtained.

Methods of synthesis by publicly known technologies can be used for the ring-opening addition reaction of the compound having one or more carboxylic anhydride structures in the molecule and, as described in the aforementioned JP-A-2003-213201, the following methods are named as examples: (1) a method comprising adding a required amount of a carboxylic anhydride when the polyester resin before addition of the carboxylic anhydride is in a molten state (150 to 280° C.) immediately after reaching a target molecular weight (Mn=3,000 to 100,000); (2) a method comprising adding the carboxylic anhydride when the polyester resin has a molecular weight (Mn<3,000) less than the target molecular weight, followed by increasing the molecular weight to the target value under a nitrogen atmosphere; and (3) a method comprising kneading the polyester resin having no acid added thereto and the carboxylic anhydride in a melt extruder, then melting the mixture batchwise, and add-reacting an acid with the system.

Examples of the compound having two or more carboxylic anhydride groups in the molecule are pyromellitic anhydride, 1,2,3,4-butanetetracarboxylic dianhydride, 1,2,3,4-pentanetetracarboxylic dianhydride, 3,4,3',4'-benzophenonetetracarboxylic dianhydride, cyclopentanetetracarboxylic dianhydride, 2,3,6,7-naphthalenetetracarboxylic dianhydride, 1,2,5,6-naphthalenetetracarboxylic dianhydride, ethylene glycol bistrimellitate dianhydride, 2,3,2',3'-diphenyltetracarboxylic dianhydride, thiophene-2,3,4,5-tetracarboxylic dianhydride, ethylene tetracarboxylic dianhydride, 4,4'-oxydiphthalic dianhydride, and 5-(2,5-dioxotetrahydro-3-furanyl)-3-methyl-3-cyclohexene-1,2-dicarboxylic anhydride. One or more of these compounds can be selected and used. Of them, ethylene glycol bistrimellitate dianhydride is preferred from the aspects of efficiency, weather resistance and ease of reaction control.

Examples of the carboxylic acid monoanhydride compound that can be used in combination with the compound having two or more carboxylic anhydride groups in the molecule are monoanhydrides such as phthalic anhydride, maleic anhydride, succinic anhydride, maleic anhydride, trimellitic anhydride, itaconic anhydride and citraconic anhydride; hexahydrophthalic anhydride; and tetrahydrophthalic anhydride. One or a combination of two or more of them can be selected and used. From the viewpoint of versatility, phthalic anhydride and trimellitic anhydride are preferred.

The number average molecular weight of the polyester resin (A) used in the present invention is in the range of 3,000 to 100,000, preferably 8,000 to 50,000, more preferably 10,000 to 30,000. If the number average molecular weight is less than 3,000, the resulting coating film may become brittle, resulting in poor processability. If the number average molecular weight exceeds 100,000, on the other hand, coating efficiency may be low.

[Polyester Resin (B)]

The polyester resin (B) used for the coating composition of the present invention is not limited and any polyester resin comprising various carboxylic acid components and alcohol components can be used, as long as its acid value is in the range of 0 to 50 mg KOH/g, especially 0 to 20 mg KOH/g, and its glass transition temperature (Tg) is in the range of −20 to 25° C., especially 0 to 15° C. It is important that the acid value be within the above range. If the acid value is higher than the above range, water resistance of the coating film may be lowered. It is also important that the glass transition temperature (Tg) be within the above range. If the Tg is higher than the above range, sufficient resistance to embrittlement over time fails to be obtained. If the Tg is lower than the above range, corrosion resistance, blocking resistance and retort resistance may be insufficient.

As the carboxylic acid component and the alcohol component, the carboxylic acid component and the alcohol component exemplified for the polyester resin (A) can be used.

Preferably, the polyester resin (B) in the present invention contains 2-methyl-1,3-propanediol, 1,4-butanediol, and 1,4-cyclohexanedimethanol among the above-mentioned alcohol components.

As in the case of the polyester resin (A), the number average molecular weight of the polyester resin (B) used in the present invention is in the range of 3,000 to 100,000, preferably 8,000 to 50,000, more preferably 10,000 to 30,000. If the number average molecular weight of the polyester resin is less than 3,000, the resulting coating film may become brittle, leading to poor processability. If the number average molecular weight exceeds 100,000, coating efficiency may be lowered.

The polyester resin (B) can be selected, as appropriate, from among commercially available polyester resins. They include, for example, Vylon 300 (produced by TOYOBO CO., LTD., molecular weight (Mn) 23,000, acid value 2 or less, Tg 7° C.), Vylon 516 (produced by TOYOBO CO., LTD., molecular weight (Mn) 30,000, acid value 2 or less, Tg −17° C.), Vylon 560 (produced by TOYOBO CO., LTD., molecular weight (Mn) 19,000, acid value 2 or less, Tg 7° C.), Vylon 630 (produced by TOYOBO CO., LTD., molecular weight (Mn) 23,000, acid value 2 or less, Tg 7° C.), Vylon GK180 (produced by TOYOBO CO., LTD., molecular weight (Mn) 10,000, acid value 5, Tg 0° C.), Vylon GK330 (produced by TOYOBO CO., LTD., molecular weight (Mn) 17,000, acid value 2 or less, Tg 16° C.), and Eritel UE-3223 (UNITIKA, LTD., molecular weight (Mn) 21,000, acid value 1, Tg 1° C.)

[Crosslinking Agent]

In the present invention, it is preferred to use a resol type phenolic resin and/or an amino resin as a crosslinking agent.

For the resol type phenolic resin, examples of a phenol monomer include o-cresol, p-cresol, p-tert-butylphenol, p-ethylphenol, 2,3-xylenol, 2,5-xylenol, phenol, m-cresol, m-ethylphenol, 3,5-xylenol, and m-methoxyphenol. They can be used alone or in combination of two or more. Such a phenol monomer and formaldehyde are reacted in the presence of an alkali catalyst to produce the resol type phenolic resin. The resol type phenolic resins in which some or all of the methylol groups contained have been etherified with alcohols having 1 to 12 carbon atoms can also be used. Of them, m-cresol resins are preferred. For example, commercially available products such as SUMILITE RESIN PR-53893A (solids content 50%) produced by Sumitomo Durez Co., Ltd. and CKS-3898 (solid content 50%) of Showa Denko K.K. can be used.

As the amino resin, urea resin, melamine resin, and benzoguanamine resin, for example, can be used. Specific examples are methylated urea resin, methyl etherified urea resin, butyl etherified urea resin, methyl ether-butyl ether mixed etherified urea resin; melamine resins such as methylolated melamine resin, methyl etherified melamine resin, butyl etherified melamine resin, and methyl ether-butyl ether mixed etherified melamine resin; methylolated benzoguanamine resin, methyl etherified benzoguanamine resin, butyl etherified benzoguanamine resin, and methyl ether-butyl ether mixed etherified benzoguanamine resin.

As commercially available products, there can be used, for example, Cymel 303 (solids content 100%), Cymel 235 (solids content 100%), Mycoat 506 (solids content 100%), Cymel 1123 (solids content 100%), UFR 65 (solids content 100%), and UFR 300 (solids content 60%) produced by Nihon Cytec Industries Inc.

[Curing Catalyst]

By using a curing catalyst in the present invention, a crosslinking reaction can be accelerated, and denser crosslinking can be performed efficiently in a short time at a low temperature.

As the curing catalyst, organic sulfonic acid compounds such as p-toluenesulfonic acid, dodecylbenzenesulfonic acid, and camphorsulfonic acid, amine neutralized compounds thereof, phosphate compounds, etc. can be used.

Among commercial products, NACURE4054J (phosphoric acid, produced by King Industries, Inc.), NACURE5076 (dodecylbenzenesulfonic acid, produced by King Industries, Inc.), Cycat 4040 (aromatic sulfonic acid, produced by Nihon Cytec Industries Inc.), Cycat 4050 (amine-blocked aromatic sulfonic acid, produced by Nihon Cytec Industries Inc.), Cycat 600 (aromatic sulfonic acid, produced by Nihon Cytec Industries Inc.), and Cycat 602 (amine-blocked aromatic sulfonic acid, produced by Nihon Cytec Industries Inc.), for example, can be used.

[Coating Composition]

The coating composition of the present invention is obtained by incorporating a crosslinking agent and a curing catalyst into a mixed polyester resin composed of the aforementioned polyester resin (A) and polyester resin (B).

The mixing ratio, as weight ratio, of the polyester resin (A) and the polyester resin (B) is preferably in the range of (A):(B)=99:1-50:50, particularly 98:2-70:30. If the proportion of the polyester resin (B) with a low Tg is less than 1, a marked reduction in the resistance to embrittlement over time occurs, and initial processability of the coated plate cannot be retained with the passage of time. If the proportion of the polyester resin (B) is higher than 50, the blocking resistance becomes so low that practical application may be impossible.

In the coating composition of the present invention, moreover, it is desirable that the glass transition temperature of the mixed polyester resin composed of the polyester resin (A) and the polyester resin (B), calculated from the aforementioned Equation (1), be 35° C. or higher, particularly, in the range of 40 to 80° C. If the Tg is lower than the above range, blocking resistance becomes poor. When the coating composition is used as a can inner surface coating, the Tg is preferably 40° C. or above because of the need for flavor properties. From the viewpoint of, say, solubility of the coating composition in a solvent, the preferred upper limit of the Tg is 80° C. or below.

The proportion of the crosslinking agent is preferably in the range of 1 to 30 parts by weight, especially, 5 to 20 parts by weight, based on 100 parts by weight of the resin content of the mixed polyester resin obtained by mixing the polyester resin (A) and the polyester resin (B). If the amount of the crosslinking agent added is less than 1 part by weight, curability becomes insufficient, and resistance to embrittlement over time, processability, resistance to contents, retort resistance, and blocking resistance may become inferior. If the amount added is more than 30 parts by weight, curing may be excessive to make processability insufficient.

The proportion of the curing catalyst is preferably in the range of 0.1 to 3.0 parts by weight, particularly 0.1 to 2.0 parts by weight, relative to 100 parts by weight of the total resin solid content including the resin content of the mixed polyester resin, and other resin content including the crosslinking agent. If the amount of the curing catalyst incorporated is smaller than the above-mentioned range, the effect of accelerating the curing reaction obtained by incorporating the curing catalyst is insufficient. If the amount of the curing catalyst incorporated is larger than the above range, on the other hand, the curing accelerating effect may be so high as to render processability insufficient.

To the coating composition of the present invention, publicly known additives such as lubricants, antifoaming agents, leveling agents and pigments can be added by known formulations.

The coating composition of the present invention can be used, with the above-mentioned polyester resin (A), polyester resin (B), crosslinking agent and curing catalyst being dissolved in a known organic solvent. Examples of the organic solvent used are aromatic hydrocarbons such as toluene, xylene and solvesso; esters such as ethyl acetate, butyl acetate and dibasic acid ester; ketones such as methyl ethyl ketone, methyl isobutyl ketone, cyclohexanone and isophorone; ether alcohols such as butyl cellosolve and butyl carbitol; alcohol ketones such as diacetone alcohol; and alcohols such as isopropyl alcohol, n-butanol, amyl alcohol and n-hexanol. Any of these solvents is selected in consideration of solubility, coating efficiency, etc.

Furthermore, the coating composition of the present invention can be rendered aqueous by a publicly known method, and used as a water-based coating composition. For example, a basic compound such as ammonia or an organic amine compound, water, or further an organic solvent are compounded together with the aforementioned polyester resins (A) and (B), crosslinking agent, and curing catalyst to prepare a water-based coating composition.

For the coating composition of the present invention, other resins can be further used, in such amounts as not to impair the excellent characteristics of the coating composition of the present invention, for the purpose of modifications such as imparting the flexibility and adhesion of the coating film. Examples of the other resins are ethylene-polymerizable unsaturated carboxylic acid copolymer, ethylene-polymerizable carboxylic acid copolymeric ionomer, and nonaqueous polyester resin. By incorporating at least one resin selected from these resins, it may be possible to impart flexibility and adhesion to the coating film effectively.

[Coated Metal Plate]

The coated metal plate of the present invention is obtained by coating a metal plate with the coating composition of the present invention.

Examples of the usable metal plate are a hot-rolled steel sheet, a cold-rolled steel sheet, a galvanized steel sheet, an electrogalvanized steel sheet, an alloy plated steel sheet, an aluminum-zinc alloy plated steel sheet, an aluminum plate, a tinned steel sheet, a stainless steel sheet, a copper plate, a copper plated steel sheet, tin-free steel, a nickel plated steel sheet, a thin tin plated steel sheet, and a chromated steel sheet. These metal plates are subjected, if required, to various surface treatments and primer treatment before use.

The coated metal plate of the present invention can be obtained by coating a metal plate with the coating composition of the present invention by a publicly known coating method such as roll coating or spray coating, and baking the coated metal plate by a heating means such as a coil oven. A cured coating film of the coating composition of the present invention is effectively inhibited from embrittling over time. Thus, the coating composition of the present invention can be effectively used, particularly when formed into a coating film by coil baking which is performed at a high temperature in a short time and is particularly susceptible to embrittlement over time.

The thickness of the coating film is not limited, but is preferably in the range of 3 to 18 μm, more preferably, 3 to 12 μm as a dry film thickness. The dry film thickness is appropriately determined by intended uses for the coated metal plate. The baking conditions for the coating film are adjusted, as appropriate, depending on the types of the polyester resins used, the type of the crosslinking agent used, the type of the solvent used, the type of the metal material to be coated, the thickness, the coating speed, etc.

[Metal Container and Metal Closure]

The metal container of the present invention has a coating film of the coating composition of the present invention formed on the inner surface and/or outer surface of a metal container. The coating composition of the present invention has exceptional corrosion resistance and flavor properties, so that a coating film comprising the coating composition of the present invention is desirably formed on at least the inner surface of the metal container.

As the metal container to be provided with the coating film, all of publicly known metal containers can be used. Examples of the metal container include, but not limited to, three-piece cans having seams at the side and seamless cans (two-piece cans).

The metal container of the present invention can be formed from the aforementioned coated metal plate. However, a metal container such as a seamless can, which is formed by severe processing, can also be formed by applying the coating composition of the present invention to a preformed metal container.

Furthermore, the metal closure of the present invention can be formed from the aforementioned coated metal plate of the present invention by a publicly known arbitrary method of closure production. In general, the metal closure is formed as a stay-on tab type easy-opening can closure or a full-open type easy-opening can closure.

EXAMPLES

The present invention will be described more specifically by reference to examples, in which parts refer to parts by weight.

Respective items were measured by the following methods:

(1) Number Average Molecular Weight of Polyester Resin

Measured by gel permeation chromatography (GPC) using the calibration curve of standard polystyrene.

(2) Glass Transition Temperature

Measured at a temperature increase rate of 20° C./min using a differential scanning calorimeter (DSC).

(3) Acid Value 0.2 g of polyester was dissolved in 20 ml of chloroform, titrated with a 0.1N KOH-ethanol solution to obtain the acid value of the resin (mgKOH/g). Phenolphthalein was used as an indicator.

(4) Preparation of Test Coated Plate

The coating composition of each of the Examples and Comparative Examples was coated on a #5182 aluminum sheet with a thickness of 0.28 mm using a bar coater to form a film (dry film weight 100 mg/100 cm$^2$), and the film was baked by a coil oven. The baking conditions were a peak metal temperature (PMT) of 260° C. for the aluminum sheet, and a total baking time (TOT) of 28 seconds. The resulting coated plates were each subjected to various tests according to the test methods explained below.

(4)-1 Resistance to Embrittlement Over Time

Resistance to embrittlement over time was evaluated in terms of initial processability versus processability over time.

Processability:

The test coated plate was cut into a size of 3×5 cm such that the side of the aluminum sheet in its rolling direction would be the long side of the resulting test piece. The test piece was then folded in parallel to its short side such that its coated surface would face outward. Two aluminum sheets 0.28 mm thick were interposed inside the fold in an atmosphere of 25° C., and subjected to impact bending with the use of a seam folding type Du Pont impact tester. An iron weight weighing 3.5 kg and having a flat contact surface for impact bending was dropped from a height of 12.5 cm. A 2 cm width portion at the bent leading end was brought into contact with a sponge dipped in a 1% aqueous solution of sodium chloride, a voltage of 6.2 V was applied, and the current value (mA) of the 2 cm portion was measured 4 seconds later.

Initial processability: Evaluated within 8 hours after preparation of the test coated plate.

Processability over time: The test coated plate was placed in a thermostatic chamber at 40° C. within 8 hours after preparation, stored there for 1 month, and then evaluated as was initial processability.

Evaluation criteria were as follows:

⊚ (Excellent): Less than 0.5 mA.

○ (Good): 0.5 mA to less than 1.0 mA.

Δ (Fair): 1.0 mA to less than 3 mA.

X (Poor): 3 mA or more.

(4)-2 Corrosion Resistance

The coated plate having convexities formed by the Du Pont impact tester (impact bar ¼ inches, weight of 300 g was dropped from the height of 12.5 cm) was soaked in a contents-simulating liquid (citric acid/ethanol/water-5/10/85) at 40° C. for 7 days, and the degree of corrosion was visually evaluated.

⊚: No corrosion.

○: Little corrosion.

Δ: Slight corrosion.

X: Marked corrosion.

(4)-3 Retort Resistance

The test coated plate was soaked in water, treated at 125° C. for 30 minutes in an autoclave, and then evaluated for blushing.

Blushing: Evaluated visually by observing the state of blushing of the coating film.

⊚: No blushing.

○: Little blushing.

Δ: Slight blushing.

X: Marked blushing.

(4)-4 Blocking Resistance

The coated surfaces of the coated plates each cut to a size of 8×8 cm were superposed on each other. The coated plates in this superposed state were placed under a pressure of 0.36 MPa at a temperature of 50° C. for 2 minutes by use of a thermocompression press, and then cooled to room temperature. Then, the degree of blocking between the respective coated surfaces was evaluated by peeling the coated plates from each other, beginning at their ends.

⊚: No blocking.

Δ: Slight blocking.

X: Marked blocking.

(4)-5 Scrape Resistance

The slide tester HEIDON-14DR (produced by Shinto Scientific Co., Ltd.) was used. A ball bearing under a load was slid over the surface of the coating film, and the number of times the ball bearing was slid until the coating film was scraped to expose the aluminum substrate was counted for evaluation. The test conditions were a stainless steel ball with a diameter of 10 mm, a sliding speed of 6000 mm/min, a sliding distance of 10 mm, a load of 1 kg, and a coated plate temperature of 25° C.

⊚: 1,000 times or more.

○: 500 times to less than 1,000 times.

Δ: 100 times to less than 500 times.

X: Less than 100 times.

(5) Preparation of Closure

A 206 diameter shell (a closure before mounting of an opening tab is referred to as a shell) having a depth, of a radius portion of a reinforced annular groove from the center panel, of 2.5 mm and a radius of curvature, of the radius portion, of 0.50 mm was formed from the aforementioned coated plate by a shell molding machine. The shell was scored (score remaining thickness 95 μm), riveted, and mounted with an opening tab, from the closure outer side, to prepare a closure.

(5)-1 Resistance of Closure to Embrittlement Over Time

Processability over time: The coated plate after 1 month of storage at 40° C. was formed into a shell. The shell was coated with a compound, then stored for 2 weeks at 40° C., and then subjected to end formation steps (scoring, mounting of tab, etc.).

The closure obtained as above was evaluated in the following manner:

Five of the coated closures immediately after coating (within 8 hours at RT) and those after 1 month of storage (40° C.) were measured for current value, and the difference between the averages of the measured values was used for evaluation. The measurement conditions were energization at a voltage of 6.2 V for 4 seconds, followed by the measurement of the current values.

⊚: Within 0.2 mA (no increase in value).

○: Within 0.5 mA (no increase in value).

Δ: Within 1.0 mA (no increase in value).

X: Increase in value.

(5)-2 Corrosion Resistance of Closure

A 350 g can formed by drawing and ironing a tin-free steel material having both surfaces laminated with PET was cold packed with Coca Cola (liquid temperature: 5° C., amount of air inside the can: 2 ml or less) under the following conditions: gas volume of 3.75, and amount of contents 345 g. Then, the packed can was warmed (40° C., 10 minutes). The so obtained sample was stored in an inverted posture (the closure facing downward) in a thermostatic chamber at 37° C. for 6 months. Then, the closure was opened, and the inner surface of the closure was observed. The observation was made by a stereoscopic microscope and a metallurgical microscope, and the presence of corrosion spots on, and the presence of perforations in, the inner surface of the closure were examined (n=5 for each item).

○: No corrosion or little corrosion (except score and rivet).
X: Perforations or possibility of perforations.
(5)-3 Retort Resistance of Closure A 350 g can formed by drawing and ironing a tin-free steel material laminated on both surfaces with PET was charged with 340 g of water. Liquid nitrogen was added dropwise so as to make the internal pressure 0.1 kgf/cm², and then the can was seamed with an aluminum closure. The seamed can was subjected to stationary retort treatment with steam at 125° C. for 30 minutes, and cooled such that the internal liquid temperature fell to lower than 40° C. within 10 minutes after completion of heating.

The closure was then removed, and the state of blushing on the inner surface of the closure was evaluated (n=3 for each condition).
◎: No blushing.
○: Little blushing.
Δ: Slight blushing.
X: Marked blushing.
(5)-4 Scrape Resistance of Closure Continuous processing was carried out for 50 of the samples at each level by a conversion press, and the state of the coating film of the side wall of the rivet was visually observed. For damage to the coating film, the presence of metal exposure was judged by dipping the sample in a 20% aqueous solution of copper sulfate for 1 minute and examining Cu precipitation.
○: No damage to coating film.
Δ: Superficial damage (no metal exposure).
X: Scrape occurred (metal exposed).

[Synthesis of Polyester Resin (A)]

Synthesis Example

Polyester Resin (A)-a 446 parts of dimethylterephthalic acid, 2.2 parts of trimellitic acid, 57 parts of ethylene glycol, 246 parts of propylene glycol, 66 parts of 1,4-cyclohexanedimethanol, and 0.2 parts of titanium tetrabutoxide were charged into a 3 L four-necked flask to construct a polymerization system. The system was gradually heated to 220° C. over 4 hours to perform ester interchange. The pressure was reduced over 30 minutes to 10 mm Hg for initial polymerization, and the temperature was increased to 250° C. Under these conditions, postpolymerization was performed for 90 minutes at 1 mm Hg or lower. When the target molecular weight was reached, the contents were cooled to 220° C. in a nitrogen atmosphere. Then, 20 parts of ethylene glycol bistrimellitate dianhydride and 5 parts of trimellitic anhydride were successively charged into the system, and stirring was continued at 200 to 230° C. for 1 hour under a nitrogen atmosphere. The contents were then withdrawn to yield polyester resin (A)-a of the present invention. The Tg, acid value and number average molecular weight of this resin are shown in Table 1.

[Synthesis Example of Polyester Resin (B)]

Synthesis Example

Polyester Resin (B)-a 106 parts of terephthalic acid, 225 parts of isophthalic acid, 4 parts of trimellitic anhydride, 143 parts of 2-methyl-1,3-propanediol, 86 parts of 1,4-butanediol, 92 parts of 1,4-cyclohexanedimethanol, and 0.13 parts of titanium tetrabutoxide were charged into a 2 L four-necked flask, and the temperature was gradually raised to 220° C. over 4 hours to distill off water and carry out esterification. After a predetermined amount of water was distilled off, the pressure was reduced over 30 minutes to 10 mmHg to perform initial polymerization, and the temperature was raised to 250° C. Under these conditions, postpolymerization was performed for 50 minutes at 1 mm Hg or lower. Then, the polymerization under reduced pressure was terminated, and the resulting resin was withdrawn to obtain polyester resin (B)-a of the present invention. The Tg, acid value, and number average molecular weight of the resin are shown in Table 2.

Similarly, polyester resins (A)-b to (A)-i having the acid values and the Tgs shown in Table 1 and Table 2 were prepared, except that the carboxylic anhydride was used as an indispensable material, its amount was changed, and the types or amounts of the other monomers were changed. Also similarly, polyester resins (B)-b to (B)-g having the acid values and the Tgs shown in Table 1 and Table 2 were prepared, except that the types or amounts of the monomers were changed.

TABLE 1

| | Polyester resin (A) | | | | | | | | |
|---|---|---|---|---|---|---|---|---|---|
| | Examples | | | | | Comparative Examples | | | |
| | (A)-a | (A)-b | (A)-c | (A)-d | (A)-e | (A)-f | (A)-g | (A)-h | (A)-i |
| Tg (° C.) | 90 | 40 | 55 | 45 | 50 | 102 | 30 | 53 | 43 |
| Acid value (mgKOH/g) | 16 | 14 | 45 | 5 | 15 | 14 | 18 | 61 | 1 |
| Number average molecular weight | 15,000 | 20,000 | 8,000 | 15,000 | 17,000 | 18,000 | 16,000 | 6,000 | 22,000 |

TABLE 2

| | Examples | | | | | Comparative Examples | |
|---|---|---|---|---|---|---|---|
| Polyester resin (B) | (B)-a | (B)-b | (B)-c | (B)-d | (B)-e | (B)-f | (B)-g |
| Tg (° C.) | 22 | −17 | 5 | 7 | 5 | −30 | 3 |
| Acid value (mgKOH/g) | 15 | 10 | 40 | 1 | 15 | 10 | 60 |
| Number average molecular weight | 13,000 | 10,000 | 8,000 | 18,000 | 13,000 | 10,000 | 5,000 |

[Preparation of Coating Composition]

Predetermined amounts of the polyester resin (A), the polyester resin (B) and a solvent were charged into a flask, heated, and thoroughly stirred at 100° C. or lower until being dissolved. After complete dissolution, the resulting polyester resin solution was cooled to room temperature and, with thorough stirring, a predetermined crosslinking agent and a predetermined curing catalyst were added to prepare a coating composition. The crosslinking agents used were Sumilite Resin PR-53893A (m-cresol resol type phenolic resin) of Sumitomo Durez Co., Ltd. and Mycoat 506 (butylated melamine resin) of Nihon Cytec Industries Inc. The curing catalyst used was Cycat 602 (amine-blocked dodecylbenzenesulfonic acid) of Nihon Cytec Industries Inc. Coated metal plates and coated metal closures were produced using the respective coating compositions, and evaluated. The results are shown in Table 3 and Table 4.

TABLE 3

| | | Tg (° C.) | Acid value (mgKOH/g) | Number average molecular weight | Examples | | | | | | | | | |
|---|---|---|---|---|---|---|---|---|---|---|---|---|---|---|
| | | | | | 1 | 2 | 3 | 4 | 5 | 6 | 7 | 8 | 9 | 10 |
| Polyester resin (A) | (A)-a | 90 | 16 | 15,000 | 90 | | | | | | | | | |
| | (A)-b | 40 | 14 | 20,000 | | 90 | | | | | | | | |
| | (A)-c | 55 | 45 | 8,000 | | | 90 | | | | | | | |
| | (A)-d | 45 | 5 | 15,000 | | | | 90 | | | | | | |
| | (A)-e | 50 | 15 | 17,000 | | | | | 90 | 90 | 90 | 90 | 90 | 98 |
| | (A)-f | 102 | 14 | 18,000 | | | | | | | | | | |
| | (A)-g | 30 | 18 | 16,000 | | | | | | | | | | |
| | (A)-h | 53 | 61 | 6,000 | | | | | | | | | | |
| | (A)-i | 43 | 1 | 22,000 | | | | | | | | | | |
| Polyester resin (B) | (B)-a | 22 | 15 | 13,000 | | | | | 10 | | | | | |
| | (B)-b | −17 | 10 | 10,000 | | | | | | 10 | | | | |
| | (B)-c | 5 | 40 | 8,000 | | | | | | | 10 | | | |
| | (B)-d | 7 | 1 | 18,000 | | | | | | | | 10 | | |
| | (B)-e | 5 | 15 | 13,000 | 10 | 10 | 10 | 10 | | | | | 10 | 2 |
| | (B)-f | −30 | 10 | 10,000 | | | | | | | | | | |
| | (B)-g | 3 | 60 | 5,000 | | | | | | | | | | |
| | Tgmix(° C.) | | | | 80 | 36 | 49 | 40 | 47 | 42 | 45 | 45 | 45 | 49 |
| Crosslinking agent | Sumilite Resin (PR-53893A) | | | | 10 | 10 | 10 | 10 | 10 | 10 | 10 | 10 | 10 | 10 |
| | Mycoat 506 | | | | | | | | | | | | | |
| Curing catalyst | Cycat 602 | | | | 1.0 | 1.0 | 1.0 | 1.0 | 1.0 | 1.0 | 1.0 | 1.0 | 1.0 | 1.0 |

| | | Tg (° C.) | Acid value (mgKOH/g) | Number average molecular weight | Examples | | | | | | | | | |
|---|---|---|---|---|---|---|---|---|---|---|---|---|---|---|
| | | | | | 11 | 12 | 13 | 14 | 15 | 16 | 17 | 18 | 19 | 20 |
| Polyester resin (A) | (A)-a | 90 | 16 | 15,000 | | | | | | | | | | |
| | (A)-b | 40 | 14 | 20,000 | | | | | | | | | | |
| | (A)-c | 55 | 45 | 8,000 | | | | | | | | | | |
| | (A)-d | 45 | 5 | 15,000 | | | | | | | | | | |
| | (A)-e | 50 | 15 | 17,000 | 80 | 70 | 50 | 90 | 90 | 90 | 90 | 90 | 90 | 90 |
| | (A)-f | 102 | 14 | 18,000 | | | | | | | | | | |
| | (A)-g | 30 | 18 | 16,000 | | | | | | | | | | |
| | (A)-h | 53 | 61 | 6,000 | | | | | | | | | | |
| | (A)-i | 43 | 1 | 22,000 | | | | | | | | | | |
| Polyester resin (B) | (B)-a | 22 | 15 | 13,000 | | | 50 | | | | | | | |
| | (B)-b | −17 | 10 | 10,000 | | | | | | | | | | |
| | (B)-c | 5 | 40 | 8,000 | | | | | | | | | | |
| | (B)-d | 7 | 1 | 18,000 | | | | | | | | | | |
| | (B)-e | 5 | 15 | 13,000 | 20 | 30 | | 10 | 10 | 10 | 10 | 10 | 10 | 10 |
| | (B)-f | −30 | 10 | 10,000 | | | | | | | | | | |
| | (B)-g | 3 | 60 | 5,000 | | | | | | | | | | |

TABLE 3-continued

|  |  | | | | | | | | | | |
|---|---|---|---|---|---|---|---|---|---|---|---|
|  | Tgmix(° C.) | 40 | 35 | 35 | 45 | 45 | 45 | 45 | 45 | 45 | 45 |
| Crosslinking agent | Sumilite Resin (PR-53893A) | 10 | 10 | 10 | 1 | 30 | 10 | 15 | 0 | 10 | 10 |
|  | Mycoat 506 |  |  |  |  |  | 5 | 15 | 30 |  |  |
| Curing catalyst | Cycat 602 | 1.0 | 1.0 | 1.0 | 1.0 | 1.0 | 1.0 | 1.0 | 1.0 | 0.1 | 3.0 |

|  |  | Examples | | | | | | | | | |
|---|---|---|---|---|---|---|---|---|---|---|---|
|  |  | 1 | 2 | 3 | 4 | 5 | 6 | 7 | 8 | 9 | 10 |
| Evaluation of coated plate | Resistance to embrittlement over time (initial processability) | ○ | ◎ | ○ | ○ | ◎ | ○ | ○ | ○ | ○ | ○ |
|  | Resistance to embrittlement over time (processability over time) | ○ | ◎ | ○ | ○ | ○ | ○ | ○ | ○ | ○ | ○ |
|  | Corrosion resistance | ◎ | ○ | ○ | ○ | ○ | ○ | ○ | ○ | ○ | ○ |
|  | Retort resistance | ○ | ○ | ○ | ○ | ○ | ○ | ○ | ○ | ○ | ○ |
|  | Blocking resistance | ○ | ○ | ○ | ○ | ○ | ○ | ○ | ○ | ○ | ○ |
|  | Scrape resistance | ◎ | ○ | ○ | ○ | ○ | ○ | ○ | ○ | ○ | ○ |
| Evaluation of closure | Resistance to embrittlement over time (processability over time) | ○ | ◎ | ○ | ○ | ○ | ○ | ○ | ○ | ○ | ○ |
|  | Corrosion resistance | ○ | ○ | ○ | ○ | ○ | ○ | ○ | ○ | ○ | ○ |
|  | Retort resistance | ○ | ○ | ○ | ○ | ○ | ○ | ○ | ○ | ○ | ○ |
|  | Scrape resistance | ○ | ○ | ○ | ○ | ○ | ○ | ○ | ○ | ○ | ○ |

|  |  | Examples | | | | | | | | | |
|---|---|---|---|---|---|---|---|---|---|---|---|
|  |  | 11 | 12 | 13 | 14 | 15 | 16 | 17 | 18 | 19 | 20 |
| Evaluation of coated plate | Resistance to embrittlement over time (initial processability) | ◎ | ◎ | ○ | ○ | ○ | ○ | ○ | ○ | ◎ | ○ |
|  | Resistance to embrittlement over time (processability over time) | ◎ | ◎ | ○ | ○ | ○ | ○ | ○ | ○ | ○ | ○ |
|  | Corrosion resistance | ○ | ○ | ○ | ○ | ◎ | ◎ | ◎ | ○ | ○ | ◎ |
|  | Retort resistance | ○ | ○ | ○ | ○ | ○ | ○ | ○ | ○ | ○ | ○ |
|  | Blocking resistance | ○ | ○ | ○ | ○ | ○ | ○ | ○ | ○ | ○ | ○ |
|  | Scrape resistance | ○ | ○ | ○ | ○ | ○ | ○ | ○ | ○ | ○ | ○ |
| Evaluation of closure | Resistance to embrittlement over time (processability over time) | ◎ | ◎ | ○ | ○ | ○ | ○ | ○ | ○ | ○ | ○ |
|  | Corrosion resistance | ○ | ○ | ○ | ○ | ○ | ○ | ○ | ○ | ○ | ○ |
|  | Retort resistance | ○ | ○ | ○ | ○ | ○ | ○ | ○ | ○ | ○ | ○ |
|  | Scrape resistance | ○ | ○ | ○ | ○ | ○ | ○ | ○ | ○ | ○ | ○ |

TABLE 4

|  |  | Tg (° C.) | Acid value (mgKOH/g) | Number average molecular weight | Comparative Examples | | | | | | |
|---|---|---|---|---|---|---|---|---|---|---|---|
|  |  |  |  |  | 1 | 2 | 3 | 4 | 5 | 6 | 7 |
| Polyester resin (A) | (A)-a | 90 | 16 | 15,000 |  |  |  |  |  |  |  |
|  | (A)-b | 40 | 14 | 20,000 |  |  |  |  |  |  |  |
|  | (A)-c | 55 | 45 | 8,000 |  |  |  |  |  |  |  |
|  | (A)-d | 45 | 5 | 15,000 |  |  |  |  |  |  |  |
|  | (A)-e | 50 | 15 | 17,000 |  |  |  |  | 80 | 90 | 90 |
|  | (A)-f | 102 | 14 | 18,000 | 90 |  |  |  |  |  |  |
|  | (A)-g | 30 | 18 | 16,000 |  | 90 |  |  |  |  | 10 |
|  | (A)-h | 53 | 61 | 6,000 |  |  | 90 |  |  |  |  |
|  | (A)-i | 43 | 1 | 22,000 |  |  |  | 90 |  |  |  |
| Polyester resin (B) | (B)-a | 22 | 15 | 13,000 |  |  |  |  |  |  |  |
|  | (B)-b | −17 | 10 | 10,000 |  |  |  |  |  |  |  |
|  | (B)-c | 5 | 40 | 8,000 |  |  |  |  |  |  |  |
|  | (B)-d | 7 | 1 | 18,000 |  |  |  |  |  |  |  |
|  | (B)-e | 5 | 15 | 13,000 | 10 | 10 | 10 | 10 |  |  |  |
|  | (B)-f | −30 | 10 | 10,000 |  |  |  |  | 20 |  |  |
|  | (B)-g | 3 | 60 | 5,000 |  |  |  |  |  | 10 |  |
|  | Tgmix(° C.) |  |  |  | 89 | 27 | 47 | 39 | 30 | 44 | 48 |
| Crosslinking agent | Sumilite Resin (PR-53893A) |  |  |  | 10 | 10 | 10 | 10 | 10 | 10 | 10 |
|  | Mycoat 506 |  |  |  |  |  |  |  |  |  |  |
| Curing catalyst | Cycat 602 |  |  |  | 1.0 | 1.0 | 1.0 | 1.0 | 1.0 | 1.0 | 1.0 |

TABLE 4-continued

|  |  | Tg (° C.) | Acid value (mgKOH/g) | Number average molecular weight | Comparative Examples | | | | | | |
|---|---|---|---|---|---|---|---|---|---|---|---|
|  |  |  |  |  | 8 | 9 | 10 | 11 | 12 | 13 | 14 |
| Polyester resin (A) | (A)-a | 90 | 16 | 15,000 |  |  |  |  |  |  |  |
|  | (A)-b | 40 | 14 | 20,000 |  |  |  |  |  | 100 |  |
|  | (A)-c | 55 | 45 | 8,000 |  |  |  |  |  |  |  |
|  | (A)-d | 45 | 5 | 15,000 |  |  |  |  |  |  |  |
|  | (A)-e | 50 | 15 | 17,000 | 40 | 90 | 90 | 90 | 90 |  |  |
|  | (A)-f | 102 | 14 | 18,000 |  |  |  |  |  |  |  |
|  | (A)-g | 30 | 18 | 16,000 |  |  |  |  |  |  |  |
|  | (A)-h | 53 | 61 | 6,000 |  |  |  |  |  |  |  |
|  | (A)-i | 43 | 1 | 22,000 |  |  |  |  |  |  |  |
| Polyester resin (B) | (B)-a | 22 | 15 | 13,000 |  |  |  |  |  |  | 100 |
|  | (B)-b | −17 | 10 | 10,000 |  |  |  |  |  |  |  |
|  | (B)-c | 5 | 40 | 8,000 |  |  |  |  |  |  |  |
|  | (B)-d | 7 | 1 | 18,000 |  |  |  |  |  |  |  |
|  | (B)-e | 5 | 15 | 13,000 | 60 | 10 | 10 | 10 | 10 |  |  |
|  | (B)-f | −30 | 10 | 10,000 |  |  |  |  |  |  |  |
|  | (B)-g | 3 | 60 | 5,000 |  |  |  |  |  |  |  |
|  | Tgmix(° C.) |  |  |  | 21 | 45 | 45 | 45 | 45 | — | — |
| Crosslinking agent | Sumilite Resin (PR-53893A) |  |  |  | 10 | 35 | 0 | 10 | 10 | 10 | 10 |
|  | Mycoat 506 |  |  |  |  |  |  |  |  |  |  |
| Curing catalyst | Cycat 602 |  |  |  | 1.0 | 1.0 | 1.0 | 0.0 | 4.0 | 1.0 | 1.0 |

|  |  | Comparative Examples | | | | | | |
|---|---|---|---|---|---|---|---|---|
|  |  | 1 | 2 | 3 | 4 | 5 | 6 | 7 |
| Evaluation of coated plate | Resistance to embrittlement over time (initial processability) | ⊚ | ⊚ | Δ | ○ | ○ | Δ | ○ |
|  | Resistance to embrittlement over time (processability over time) | Δ | ○ | Δ | ○ | ○ | Δ | X |
|  | Corrosion resistance | ○ | Δ | ○ | Δ | Δ | ○ | ○ |
|  | Retort resistance | ⊚ | ○ | Δ | ○ | ○ | Δ | ○ |
|  | Blocking resistance | ○ | X | ○ | ○ | X | ○ | ○ |
|  | Scrape resistance | ○ | Δ | ○ | ○ | ○ | ○ | ○ |
| Evaluation of closure | Resistance to embrittlement over time (processability over time) | Δ | ⊚ | Δ | ○ | ○ | Δ | X |
|  | Corrosion resistance | ○ | X | ○ | X | X | ○ | ○ |
|  | Retort resistance | ⊚ | ○ | Δ | ○ | ○ | Δ | ○ |
|  | Scrape resistance | ○ | Δ | ○ | ○ | ○ | ○ | ○ |

|  |  | Comparative Examples | | | | | | |
|---|---|---|---|---|---|---|---|---|
|  |  | 8 | 9 | 10 | 11 | 12 | 13 | 14 |
| Evaluation of coated plate | Resistance to embrittlement over time (initial processability) | ○ | Δ | Δ | Δ | Δ | ○ | ○ |
|  | Resistance to embrittlement over time (processability over time) | ○ | Δ | Δ | X | Δ | Δ | ○ |
|  | Corrosion resistance | X | ○ | X | Δ | ○ | ○ | Δ |
|  | Retort resistance | Δ | ○ | X | Δ | ○ | ○ | Δ |
|  | Blocking resistance | X | ○ | Δ | Δ | ○ | ○ | Δ |
|  | Scrape resistance | Δ | ○ | X | Δ | ○ | ○ | Δ |
| Evaluation of closure | Resistance to embrittlement over time (processability over time) | ○ | Δ | Δ | Δ | Δ | Δ | ○ |
|  | Corrosion resistance | X | ○ | X | X | ○ | ○ | Δ |
|  | Retort resistance | Δ | ○ | X | Δ | ○ | ○ | Δ |
|  | Scrape resistance | Δ | ○ | X | Δ | ○ | ○ | Δ |

INDUSTRIAL APPLICABILITY

The coating composition of the present invention is excellent in all of coating film performance characteristics such as processability, resistance to embrittlement over time, corrosion resistance, scrape resistance, blocking resistance, and retort resistance. In particular, the coating composition can be used preferably for a coated metal plate which is subjected to baking in a coil oven where baking is performed at a high temperature in a short time to cause marked embrittlement over time.

Furthermore, the coated metal plate having a coating film from the coating composition of the present invention is excellent in processability, resistance to embrittlement over time, scrape resistance, and blocking resistance, and can be used preferably for the formation of a metal container or a metal closure which involves harsh processing.

Besides, the metal container or metal closure of the present invention has excellent corrosion resistance, retort resistance, and flavor properties, and thus can be used preferably for a metal container for storing corrosive contents or contents requiring retort sterilization.

The invention claimed is:

1. A coating composition consisting essentially of a crosslinking agent, a curing catalyst and a mixed polyester resin, the mixed polyester resin consisting essentially of a mixture of a polyester resin (A) and a polyester resin (B) at a weight ratio (A):(B)=98:2 to 50:50, the polyester resin (A) is a polyester resin provided with an acid value resulting from a ring-opening addition reaction of a compound having one or more carboxylic acid anhydride structures in a molecule, and when a total content of carboxylic acid anhydrides to be used for the ring-opening addition reaction is 100 mol %, 10 mol % or more of the carboxylic acid anhydrides are compounds having two or more carboxylic acid anhydride groups in a molecule, wherein the polyester resin (A) has an acid value of 2 to 45 mg KOH/g and a glass transition temperature (Tg) of 35 to 90° C., and the polyester resin (B) has an acid value of 2 to 40 mg KOH/g and a glass transition temperature (Tg) of -20 to 25° C., the crosslinking agent is a resol type phenolic resin and/or an amino resin, and is incorporated in an amount of 1 to 30 parts by weight relative to 100 parts by weight of a resin solid content of the mixed polyester resin, the curing catalyst is incorporated in an amount of 0.1 to 3.0 parts by weight relative to 100 parts by weight of a total resin solids content, the polyester resin (A) has a number average molecular weight of 8,000 to 21,000, the polyester resin (B) has a number average molecular weight of 5,000 to 25,000, the mixed polyester resin has a glass transition temperature (Tgmix) calculated from the following Equation (1) of 40 to 80° C.:

$$1/Tgmix = Wa/Tga + Wb/Tgb \ldots \quad (1)$$

where Tgmix represents the glass transition temperature (K) of the mixed polyester resin, Tga represents the glass transition temperature (K) of the polyester resin (A), Tgb represents the glass transition temperature (K) of the polyester resin (B), Wa represents a weight fraction of the polyester resin (A), and Wb represents a weight fraction of the polyester resin (B), the polyester resin (A) comprises a carboxylic acid component selected from the group consisting of aromatic dicarboxylic acids, aliphatic dicarboxylic acids, unsaturated dicarboxylic acids, alicyclic dicarboxylic acids, trivalent or higher valent carboxylic acids and monocarboxylic acids and an alcohol component selected from the group consisting of aliphatic glycols, ether glycols, alicyclic polyalcohols and trivalent or higher valent polyalcohols, the polyester resin (B) comprises a carboxylic acid component selected from the group consisting of aromatic dicarboxylic acids, aliphatic dicarboxylic acids, unsaturated dicarboxylic acids, alicyclic dicarboxylic acids, trivalent or higher valent carboxylic acids and monocarboxylic acids and an alcohol component selected from the group consisting of aliphatic glycols, ether glycols, alicyclic polyalcohols and trivalent or higher valent polyalcohols, and the polyesters (A) and (B) are non-crystalline polyesters.

2. A coated metal plate coated with the coating composition according to claim 1.

3. The coated metal plate according to claim 2 having the coating composition coil baked.

4. A metal container having a coating film formed thereon, the coating film comprising the coating composition according to claim 1.

5. A metal closure having a coating film formed thereon, the coating film comprising the coating composition according to claim 1.

* * * * *

UNITED STATES PATENT AND TRADEMARK OFFICE
CERTIFICATE OF CORRECTION

PATENT NO. : 10,508,214 B2  
APPLICATION NO. : 14/404192  
DATED : December 17, 2019  
INVENTOR(S) : Naoyuki Takagi et al.

Page 1 of 1

It is certified that error appears in the above-identified patent and that said Letters Patent is hereby corrected as shown below:

On the Title Page

Delete "(73) Assignees: TOKYO SEIKAN GROUP HOLDINGS, LTD., Tokyo (JP), VALSPAR ROCK CO., LTD. Tokyo (JP)"

Insert --(73) Assignees: TOYO SEIKAN GROUP HOLDINGS, LTD., Tokyo (JP), VALSPAR ROCK CO., LTD. Tokyo (JP)--

Signed and Sealed this  
Ninth Day of June, 2020

Andrei Iancu  
*Director of the United States Patent and Trademark Office*